United States Patent
Barsoum (10) Patent No.: US 7,302,014 B1
(45) Date of Patent: Nov. 27, 2007

(54) TIMING RECOVERY IN A TRANSMISSION SYSTEM

(75) Inventor: Maged F. Barsoum, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 778 days.

(21) Appl. No.: 10/728,843

(22) Filed: Dec. 8, 2003

(51) Int. Cl.
*H04L 27/00* (2006.01)

(52) U.S. Cl. ..................... 375/326
(58) Field of Classification Search .............. 375/341, 375/316, 260, 262, 265, 283, 200; 370/208, 370/210
See application file for complete search history.

(56) References Cited

U.S. PATENT DOCUMENTS

| | | | | |
|---|---|---|---|---|
| 5,878,085 A | * | 3/1999 | McCallister et al. | 375/280 |
| 6,148,024 A | * | 11/2000 | Ho et al. | 375/222 |
| 6,470,030 B1 | * | 10/2002 | Park et al. | 370/480 |
| 2004/0008618 A1 | * | 1/2004 | Shirakata et al. | 370/208 |
| 2006/0104195 A1 | * | 5/2006 | Nakahara et al. | 370/203 |

* cited by examiner

*Primary Examiner*—Emmanuel Bayard
(74) *Attorney, Agent, or Firm*—Harrity Snyder, LLP (57) ABSTRACT

A device that receives data transmitted over a network medium includes a memory that stores phase information associated with a pilot tone. The device also includes logic that identifies a second pilot tone received with a number of tones and determines the phase of the second pilot tone. The logic also determines a difference between the phases of the two pilot tones and modifies phase information associated with a number of tones based on the difference. The received data with the modified phase information may then be decoded.

23 Claims, 8 Drawing Sheets

TIMING RECOVERY IN A TRANSMISSION SYSTEM

TECHNICAL FIELD

The present invention relates generally to network communications and, more particularly, to timing recovery in a data transmission system.

BACKGROUND ART

In many transmission systems, both the receiver and transmitter include a clock that controls various activities. The clock is typically a crystal oscillator that controls processing-related activities associated with transmitting and receiving data over a channel. Due to minor variations, the receiver's clock and the transmitter's clock are often offset from each other, i.e., the frequency of the clock at the receiver is often different from that at the transmitter.

One problem associated with mismatched clock frequencies is that the receiver may be unable to recover the transmitted signal without errors. For example, a discrete multitone (DMT) transmission system may transmit data over 256 distinct carriers (also referred to as tones) with each carrier being separated by 4.3125 KHz. When the transmitting and receiving clocks are mismatched, the receiver may be unable to accurately decode the data transmitted on the tones. An error correction code may be inserted into the data prior to transmission to combat the problems associated with mismatched clock frequencies. However, when the frequencies of the transmitting and receiving clocks vary significantly, the error correction code may not provide adequate correction capabilities to ensure that the transmitted signal can be recovered without errors.

DISCLOSURE OF THE INVENTION

There exists a need for systems and methods for timing recovery in data transmission systems.

These and other needs are met by the present invention, where clock offset is estimated by comparing a pilot tone transmitted with a group of tones with a reference pilot tone. The receiver may then use the estimated clock offset to modify phase information to compensate for the offset between two clocks.

According to one aspect of the invention, a device that receives data transmitted over a network medium is provided. The device includes a memory configured to store first phase information associated with a first pilot tone. The device also includes logic configured to identify a second pilot tone received with a number of tones, determine second phase information associated with the second pilot tone and determine a difference between the second phase information and the first phase information. The logic is also configured to use the difference to determine offset information and modify phase information associated with each of the tones based on the offset information. The logic is further configured to decode data transmitted on each of the tones using the modified phase information.

Another aspect of the present invention provides a method in a network device that receives data transmitted using DMT modulation. The method includes storing phase information associated with a first pilot tone, receiving a number of symbols and identifying a second pilot tone in one of the symbols. The method also includes determining second phase information associated with the second pilot tone, obtaining a difference between the first phase information and the second phase information and dividing the difference by a value associated with the first pilot tone to obtain a first value. The method further includes multiplying the first value by values associated with each of the respective tones to determine phase correction information for each of the respective tones and modifying phase information associated with each of the tones based on the phase correction information.

A further aspect of the invention provides a system including a first device and a second device. The first device is configured to transmit a first waveform and the second device is configured to receive the first waveform. The second device is also configured to identify when an amplitude of the first waveform decays below a threshold, determine a length of time corresponding to when the amplitude of the first waveform decays below the threshold and transmit the determined length of time to the first device. The first device is also configured to determine a number of cyclic prefix samples to use when transmitting data to the second device based on the determined length of time.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation represent like elements throughout.

BEST MODE FOR CARRYING OUT THE INVENTION

Figure 1:
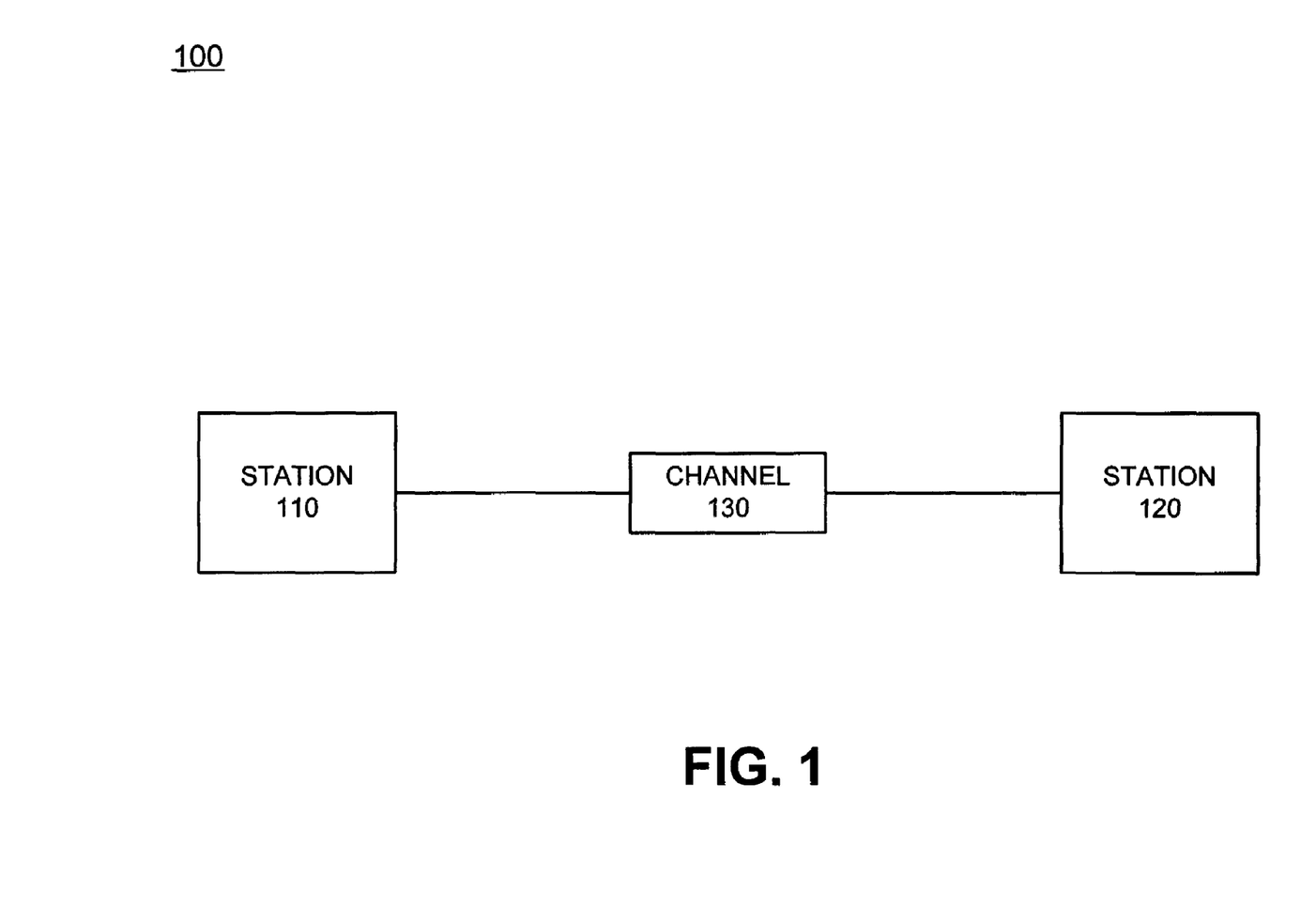
FIG. 1 is a block diagram of an exemplary network in which methods and systems consistent with the present invention may be implemented.

FIG. 1 is a block diagram of an exemplary network 100 in which systems and methods consistent with the present invention may be implemented. The exemplary network 100 includes stations 110 and 120 connected via transmission channel 130. Stations 110 and 120 may include one or more devices capable of transmitting and/or receiving data via channel 130. For example, stations 110 and 120 may transmit and receive data over channel 130 using DMT modulation techniques.

Channel 130 may include a wired or wireless transmission channel. For example, channel 130 may include conventional telephone wiring, e.g., twisted pair copper wire. Alternatively, channel 130 may include coaxial cable, a radio frequency (RF) link or some other medium that permits data to be transmitted between stations.

The number of components illustrated in FIG. 1 is provided for simplicity. A typical network may include more stations and/or transmission channels than illustrated in FIG. 1. In addition, channel 130 may connect to other networks, such as the public switched telephone network (PSTN) (not shown).

Figure 2:
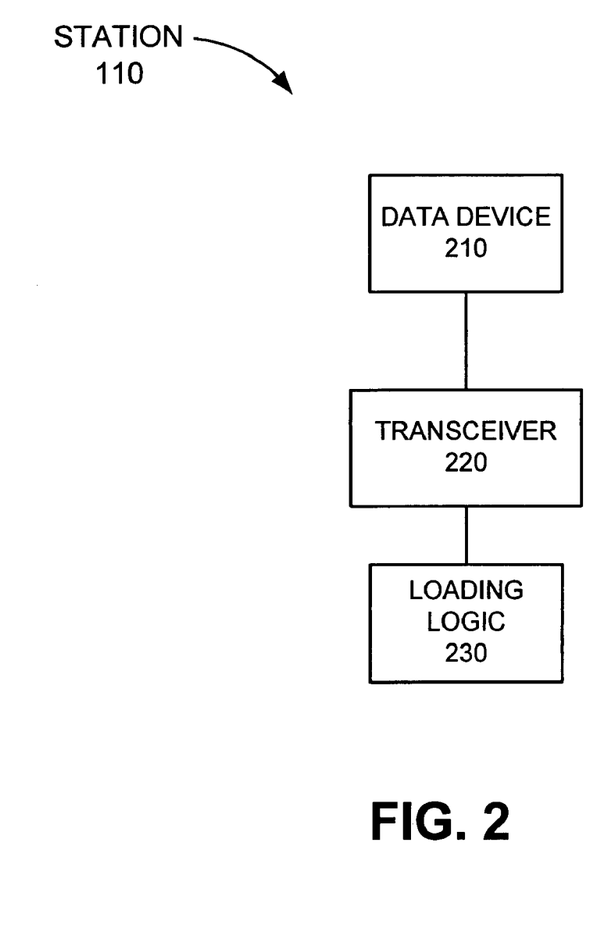
FIG. 2 is a block diagram of an exemplary configuration of a station of FIG. 1 consistent with the present invention.

FIG. 2 illustrates an exemplary configuration of station 110 of FIG. 1 in an implementation consistent with the present invention. It will be appreciated that station 120 may be similarly configured. Station 110 may include a data device 210, a transceiver 220 and loading logic 230. It should be understood that station 110 may include other components (not shown) that aid in the reception, transmission and processing of data.

Data device 210 may include some type of computing device, such as a personal computer, laptop, personal digital assistant (PDA) or some other intelligent processing device. Data device 210 may also include a media access controller (MAC) that transmits and receives data packets to/from transceiver 220.

Transceiver 220 may include one or more physical layer transceivers that transmit and receive data via channel 130. In accordance with an exemplary embodiment of the present invention, stations 110 and 120 communicate using DMT modulation techniques. Accordingly, transceiver 220, consistent with the present invention, may include a transmitter portion that receives a digital data stream from data device 210 and converts the data into a series of tones. As discussed previously, 256 carriers or tones may be used to carry data in a DMT transmission system with each tone being separated by 4.3125 KHz. Alternatively, other numbers of tones may be used to carry the data and other separations between tones may be used. Transceiver 220 may also include a receiver portion that receives data transmitted in accordance with a DMT protocol and converts received tones into a serial bit stream, as described in more detail below.

Loading logic 230 may determine the number of bits that may be loaded in each tone based on the network conditions. In accordance with an exemplary implementation of the present invention, loading logic 230 takes into account channel response, intercarrier interference (ICI) and other factors when determining the number of bits to load in each tone.

Loading logic 230 is illustrated in FIG. 2 as being a separate component from transceiver 220. It should be understood that in alternative implementations of the present invention, loading logic 230 may be part of transceiver 220.

Figure 3:
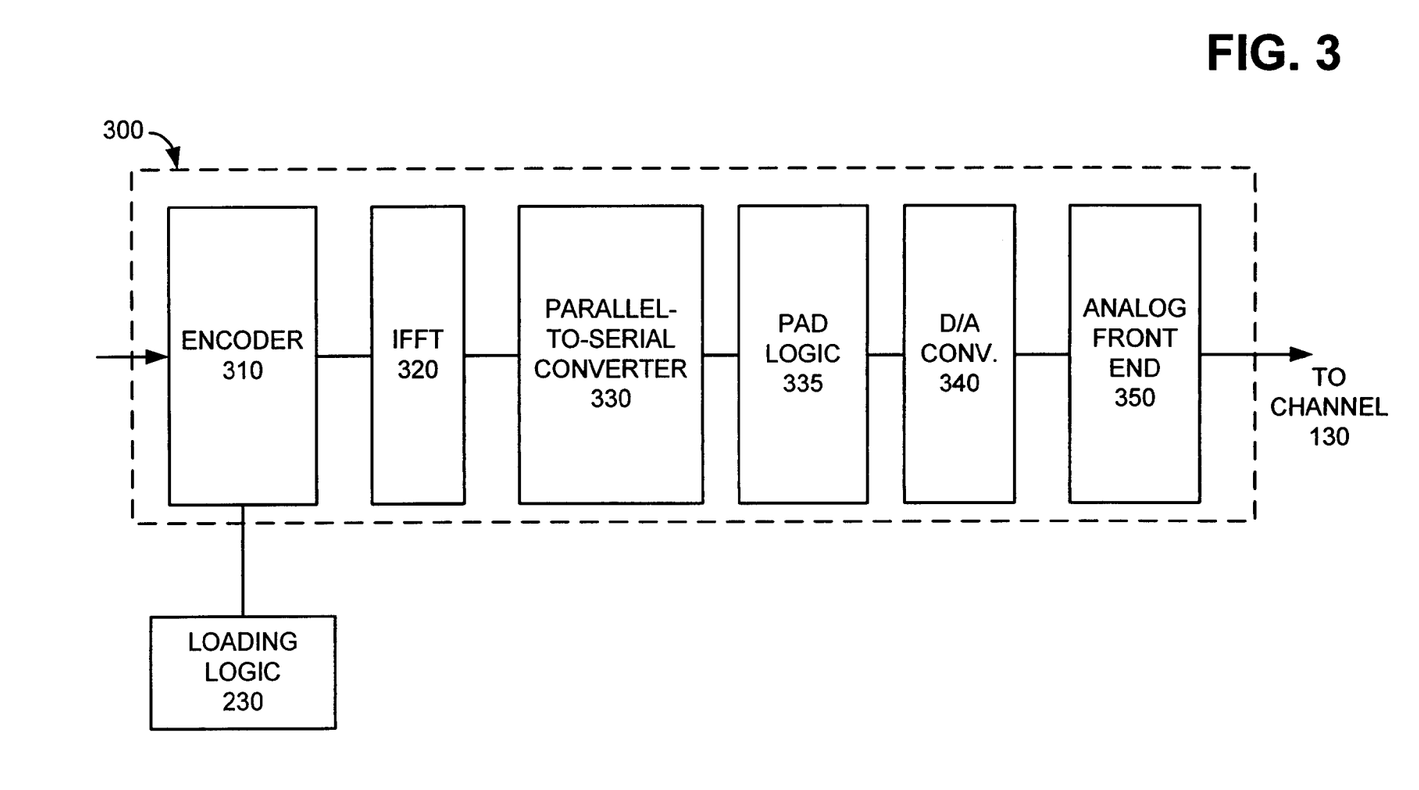
FIG. 3 is an exemplary detailed block diagram of a transmitter portion of the transceiver of FIG. 2, consistent with an implementation of the present invention.

As discussed above, transceiver 220 may include a transmitter portion and a receiver portion. FIG. 3 is an exemplary detailed diagram of the transmitter portion 300 of transceiver 220 (referred to as transmitter 300) according to an implementation consistent with the present invention. Transmitter 300 may include an encoder 310, Inverse Fast Fourier Transform (IFFT) logic 320, a parallel-to-serial converter 330, pad logic 335, a digital-to-analog (D/A) converter 340 and an analog front end (AFE) 350.

Encoder 310 receives a stream of data bits from data device 210 and may organize the bits into groups based on information received from loading logic 230, as described in more detail below. Encoder 310 encodes or maps the data bits into tones using, for example, a quadrature amplitude modulation (QAM) protocol by representing each grouping of bits with a discrete tone. In accordance with an exemplary implementation of the present invention, each tone may be modulated to carry up to 15 bits or more of data. Encoder 310 maps the designated number of bits to each respective tone and represents each tone with a complex number that indicates phase and amplitude information for that particular tone in the frequency domain.

IFFT logic 320 receives the complex numbers representing the tones from encoder 310. IFFT logic 320 converts the frequency domain information into time domain information. Parallel-to-serial converter 330 may convert the parallel time domain information from IFFT logic 320 into a serial signal stream.

Pad logic 335 may add a cyclic prefix or guard band to the serial time domain information to assist in synchronization between the transmitting device and the receiving device. D/A converter 340 may convert the serial signal stream of data to an analog format and pass the analog data to analog front end 350. Analog front end 350 receives the analog waveforms and transmits the analog waveforms on channel 130.

Figure 4:
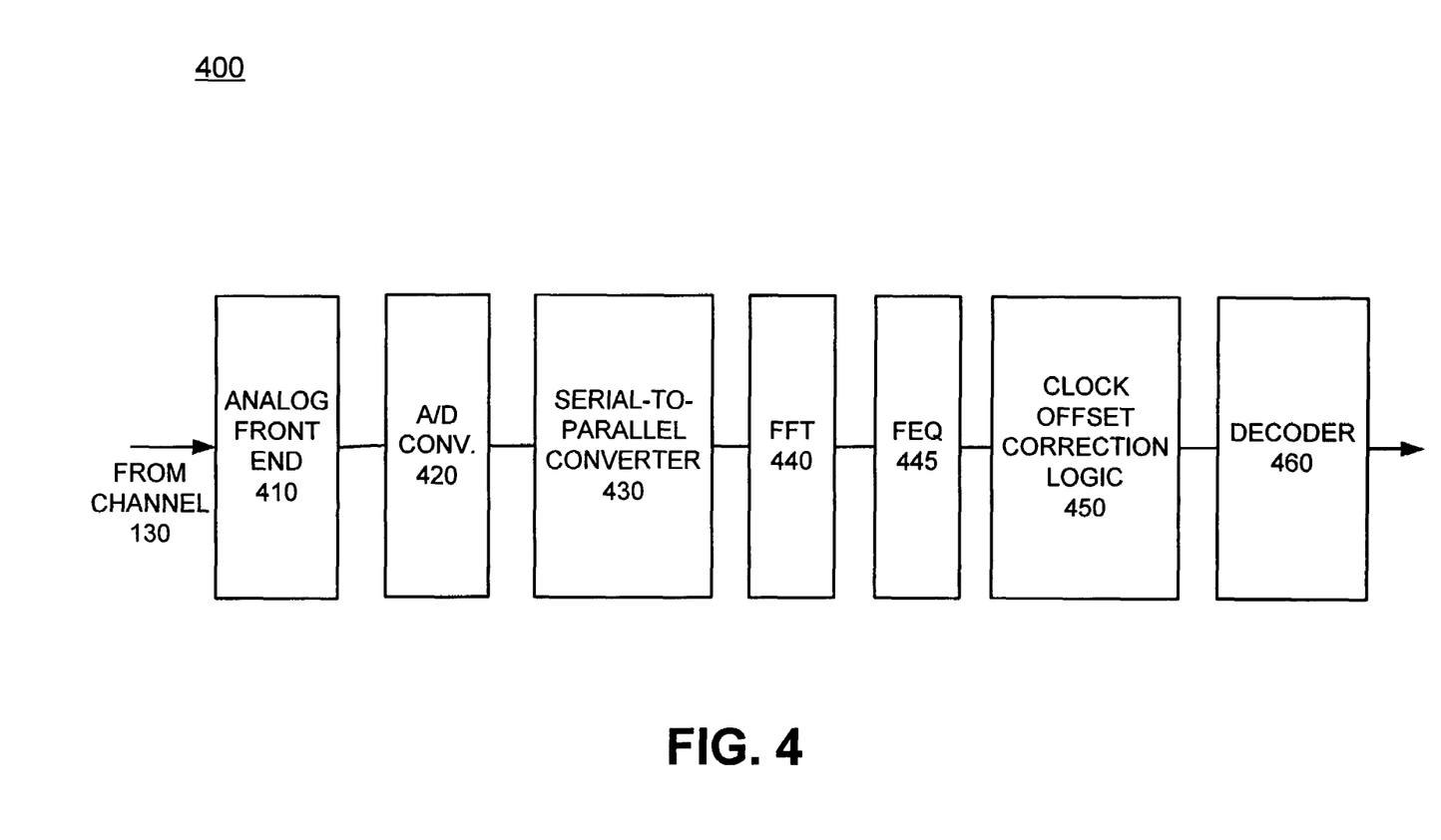
FIG. 4 is an exemplary detailed block diagram of a receiver portion of the transceiver of FIG. 2, consistent with an implementation of the present invention.

FIG. 4 is an exemplary detailed diagram of the receiver portion 400 of transceiver 220 (referred to as receiver 400) according to an implementation consistent with the present invention. Receiver 400 may include AFE 410, analog-to-digital converter (A/D) 420, serial-to-parallel converter 430, FFT logic 440, frequency equalizer (FEQ) 445, clock offset correction logic 450 and decoder 460.

AFE 410 receives analog waveforms transmitted on channel 130 and forwards these waveforms to A/D converter 420. A/D converter 420 converts the analog waveforms into a digital format. Serial-to-parallel converter 430 converts the serial waveform into a parallel format. Serial-to-parallel converter 430 may also remove the cyclic prefix from the signal. FFT logic 440 transforms the parallel data from the time domain signal back into a frequency domain representation containing amplitude and phase information for each tone. FEQ 445 equalizes the channel response, corrects for errors in detecting the start of a packet and corrects for variations in the symbol period due to clock mismatch between a transmitting clock and the receiving clock.

Clock offset correction logic 450 receives the frequency domain information and estimates the clock offset between stations, such as stations 110 and 120. For example, clock offset correction logic 450 may use the pilot tone transmitted with a group of tones or a group of several symbols to estimate the offset. Clock offset correction logic 450 may also rotate the tones (i.e., change the phase information associated with the tones) based on the estimated offset, as described in more detail below. Decoder 460 receives the frequency domain representation of the data with the offset correction and decodes the frequency domain representation back into the original serial bit stream. The decoded data may be forwarded, for example, to data device 210.

Figure 5:
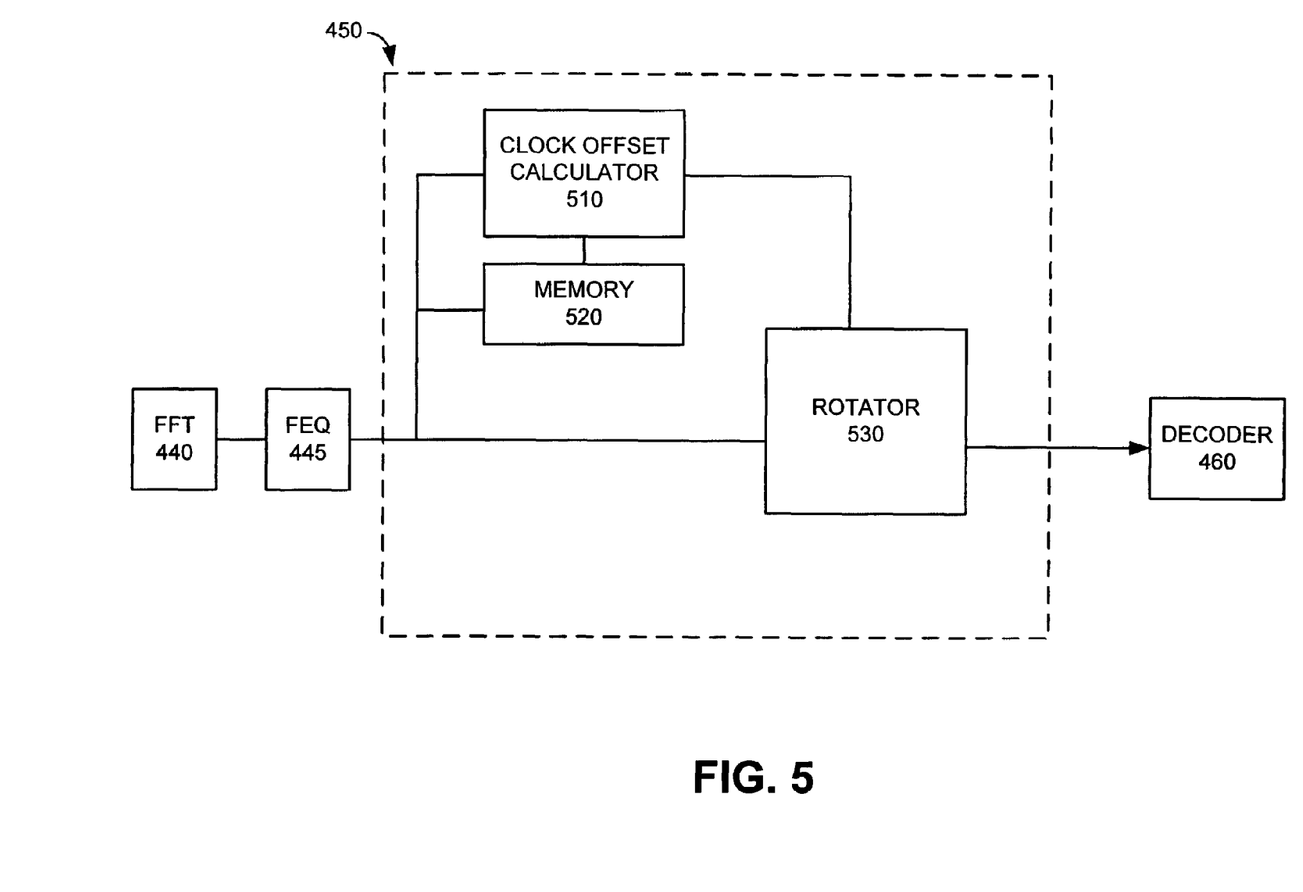
FIG. 5 is an exemplary detailed block diagram of the clock offset correction logic of FIG. 4, consistent with an implementation of the present invention.

As discussed above, the clock offset correction logic 450 compensates for the mismatch between a transmitting and receiving clock. FIG. 5 is an exemplary detailed diagram of clock offset correction logic 450 according to an exemplary implementation consistent with the present invention. Clock offset correction logic 450 includes clock offset calculator 510, memory 520 and rotator 530.

Memory 520 may include a conventional memory device, such as a conventional random access memory (RAM)

device. Clock offset calculator 510, consistent with the present invention, receives frequency domain data from FEQ 445, estimates the clock offset and determines the angle, also referred to as the phase, that each tone needs to be rotated to compensate for the clock offset. For example, clock offset calculator 510 may receive a reference symbol from FEQ 445. The reference symbol may include a number of tones, with one of the tones being a pilot tone. Clock offset calculator 510 may identify the phase associated with the pilot tone in the reference symbol and store the phase information in memory 520. This reference phase information may then be used to estimate the clock offset.

For example, when a subsequent data symbol is received, the symbol may also include a pilot tone. Clock offset calculator 510 may identify the phase of the pilot tone in the subsequent symbol and compare the phase information to the reference phase information stored in memory 520. In one implementation, clock offset calculator 510 subtracts the phase of the reference pilot tone from the phase of a current pilot tone to identify the clock offset. Clock offset calculator 510 may then divide the difference by the frequency of the pilot tone. Clock offset calculator 510 may forward this information to rotator 530.

Rotator 530 may then multiply the information received from clock offset calculator 510 by the frequency of each respective tone in the symbol. These values indicate the angle rotation needed for each of the respective tones. In other words, these values indicate the phase modification or correction needed to compensate for the clock offset between the transmitting and receiving clocks. Rotator 530 may then modify the phase information transmitted with each tone by the determined value associated with that tone and output the modified data to decoder 460. In this manner, rotator 530 outputs frequency domain information with clock offset correction.

Clock offset correction logic 450, as described above, may identify the phase information of a pilot tone transmitted with a reference symbol. The reference symbol may be transmitted during "training." Training refers to a period in which communications between two stations are initialized. In conventional DMT systems, two stations exchange handshaking information upon start-up. This information may include, for example, the particular protocol to be used between the two stations. The two stations may also perform channel analysis and exchange other information needed for transmitting and receiving data.

Clock offset correction logic 450 is also illustrated in FIG. 4 as being part of receiver 400, which is part of transceiver 220 (FIG. 2). It should be understood that in alternative implementations of the present invention, clock offset correction logic 450 may be located externally from receiver 400 and transceiver 220. It should also be understood that clock offset correction logic 450 may be implemented in hardware, software or any combination of hardware and software. Thus, the present invention is not limited to any specific combination of hardware circuitry and software.

Figure 6:
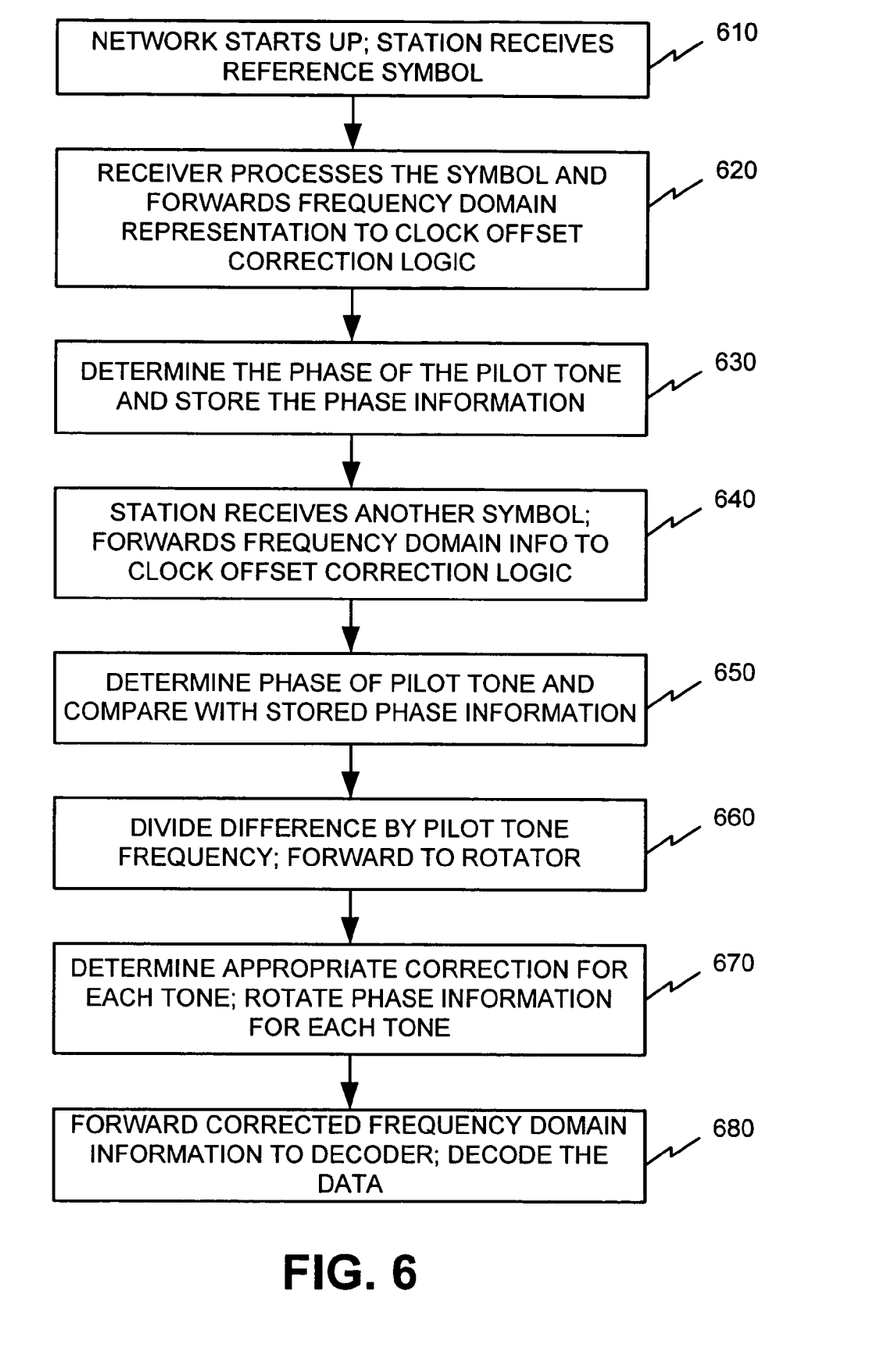
FIG. 6 is a flow diagram illustrating exemplary processing associated with estimating and correcting for clock offset, consistent with an implementation of the present invention.

As discussed above, clock offset correction logic 450 estimates and compensates for clock offset. FIG. 6 illustrates exemplary processing associated with receiving data and compensating for clock offset in accordance with an exemplary implementation consistent with the present invention.

Processing may begin upon start up on network 100 (act 610). During the start up phase, a training process may commence. The training process may include a handshaking procedure between stations 110 and 120. The handshaking may indicate that the stations will communicate via DMT modulation and indicate the particular tones that will be used.

According to an exemplary implementation of the present invention, during the training process or after the training process is completed, receiver 400 of station 110 may receive a reference symbol from another station, such as station 120 (act 610). The reference symbol may include a number of tones and one or more of the tones in the reference symbol may be a pilot tone. In an exemplary implementation consistent with the present invention, the symbol may include 256 tones and tone number 64 may be a pilot tone that corresponds to a carrier frequency of 276 KHz. In alternative implementations, the symbol may include other numbers of tones and the pilot tone may be another one of the tones. The particular tone number that corresponds to the pilot tone may also vary based on the particular system's requirements.

AFE 410, A/D converter 420, serial-to-parallel converter 430, FFT logic 440 and FEQ 445 process the tones, as discussed above with respect to FIG. 4 (act 620). For example, AFE 410 receives and forwards the data to A/D converter 420, which converts the analog data into a digital format. Serial-to-parallel converter 430 receives the digital data and outputs the data in a parallel format to FFT logic 440. FFT logic 440 transforms the parallel data from the time domain back into a frequency domain representation containing amplitude and phase information for each tone. FEQ 445 receives the frequency domain representation, equalizes for channel response and forwards the data to clock offset correction logic 450 (act 620).

Clock offset calculator 510 receives the frequency domain information associated with the tones and identifies the pilot tone and its corresponding phase (act 630). Stations 110 and 120 may be configured with information indicating which particular tone is the pilot tone or this information may be provided during training. After identifying the pilot tone and its associated phase information, the clock offset calculator 510 may store the phase of the pilot tone in memory 520 (act 630).

Assume that receiver 400 receives other symbols transmitted from station 120, with one tone in each symbol corresponding to a pilot tone (act 640). Receiver 400 processes the data as discussed above with respect to FIG. 4. That is, FFT logic 440 receives data from serial-to-parallel converter 430 and forwards frequency domain information to FEQ 445, which forwards equalized frequency domain information to clock offset correction logic 450 (act 640).

Clock offset calculator 510 receives the frequency domain data, identifies the pilot tone and determines the phase of the pilot tone (act 650). As discussed previously, the clock offset calculator 510 is configured with information indicating which tone in a group of tones is the pilot tone. Clock offset calculator 510 may then compare the phase of this pilot tone with the phase of the reference pilot tone stored in memory 520 (act 650). For example, clock offset calculator 510 may subtract the phase of the current pilot tone (received at act 640) from the phase of the pilot tone of the reference symbol (received at act 610).

Clock offset calculator 510 may then divide the difference between the current pilot tone and the reference pilot tone by the pilot tone's frequency (act 660). For example, in the implementation described above in which the pilot tone corresponds to a carrier frequency of 276 KHz, the clock offset calculator 510 may divide the difference by 276 (representing 276 K). In alternative implementations, the clock offset calculator 510 may divide the difference by 276,000. Clock offset calculator 510 forwards the offset reference value to rotator 530 (act 660).

Rotator 530 receives the offset reference value and determines the appropriate correction for each of the tones in the symbol (act 670). In an exemplary implementation consistent with the present invention, rotator 530 multiplies the offset reference value by the respective frequencies of each tone in the symbol (act 670). For example, suppose that tone 100 corresponds to a carrier frequency of 500 KHz. In this case, rotator 530 multiplies the offset reference value by 500, representing 500 KHz (or by 500,000 when the divisor at act 660 was 276,000) to obtain the information representing the clock offset between the transmitting and receiving clocks for that particular tone. Rotator 530 then rotates (i.e., modifies) the phase information associated with tone 100 by the determined value. It should be understood that instead of dividing the difference determined at act 650 with the pilot tone's frequency and then multiplying by the frequency of each particular tone, the difference determined at act 650 may be multiplied by the ratio of the frequency of each respective tone to the frequency of the pilot tone, with the result being the same.

In either case, rotator 530 determines the appropriate correction for each tone in a similar manner and modifies the phase information for each of the tones by the determined amount (act 670). Rotator 530 then outputs the frequency domain representation with the phase correction to decoder 460 (act 680). The corrected frequency domain information now has compensated for any offset between the transmitting and receiving clocks. Decoder 460 receives the frequency domain representation of the data with the phase correction and decodes the frequency domain representation back into the original serial bit stream (act 680). The decoded data may be forwarded, for example, to data device 210.

In an alternative implementation consistent with the present invention, the tone numbers associated with the tones may be used at acts 660 and 670 instead of the frequency information associated with the tones. In this implementation, the difference between the phase of the current pilot tone and the phase of the reference pilot tone may be divided by the pilot tone number. For example, if the pilot tone is tone number 64, the phase difference may be divided by 64 to obtain an offset reference value. Then, in act 670, the rotator 530 may multiply the offset reference value by the tone numbers associated with each of the respective other tones to compensate for clock offset.

In each case, the rotator 530 outputs frequency domain information for each of the tones with offset correction. The process described above with respect to acts 640-670 may be repeated for each symbol that is received. That is, each time a particular symbol is received, the clock offset correction logic 450 identifies the pilot tone, estimates the offset that has taken place and rotates the angle/phase of each tone a determined amount based on the offset.

Alternatively, the process described above with respect to acts 640-670 may be repeated each predetermined period of time based on the particular system requirements. In this case, the clock offset correction logic 450 may store the difference between the pilot tone of the reference symbol and the subsequent pilot tone (determined at act 650). This difference information may then be used, as described with respect to acts 660 and 670, to rotate tones transmitted with subsequent symbols for the predetermined period of time. After the period of time has expired, clock offset correction logic 450 may generate new information representing the difference between the reference pilot tone and a newly received pilot tone and use this information to determine the rotation needed for the other tones.

In this case, the clock offset calculations may also take into account clock offset within the predetermined period/interval. That is, the clock offset correction logic 450 may adjust the amount of rotation needed for each successive tone received in the predetermined interval by a slightly different value by extrapolating the difference information a certain amount based on when the symbol was received. In other words, clock offset correction logic 450 may determine that an earlier symbol received during the predetermined interval may need slightly less rotation than a symbol received at a later time within the predetermined interval. The adjustment per symbol may be based on an adjustment factor per unit of time that is prestored by clock offset correction logic 450 or an adjustment factor generated by clock offset correction logic 450 over time by sampling a number of symbols. In this manner, the clock offset calculations may be performed at predetermined intervals with the correction information accurately reflecting actual clock offsets that may vary over time. This may also reduce processing as compared to estimating clock drift for every symbol.

In each case, clock offset correction logic 450 estimates clock offset and compensates for the clock offset by modifying the phase information of the tones. In this manner, receiver 400 is able to accurately decode data that it receives from other stations.

ALTERNATIVE IMPLEMENTATION

Figure 7:
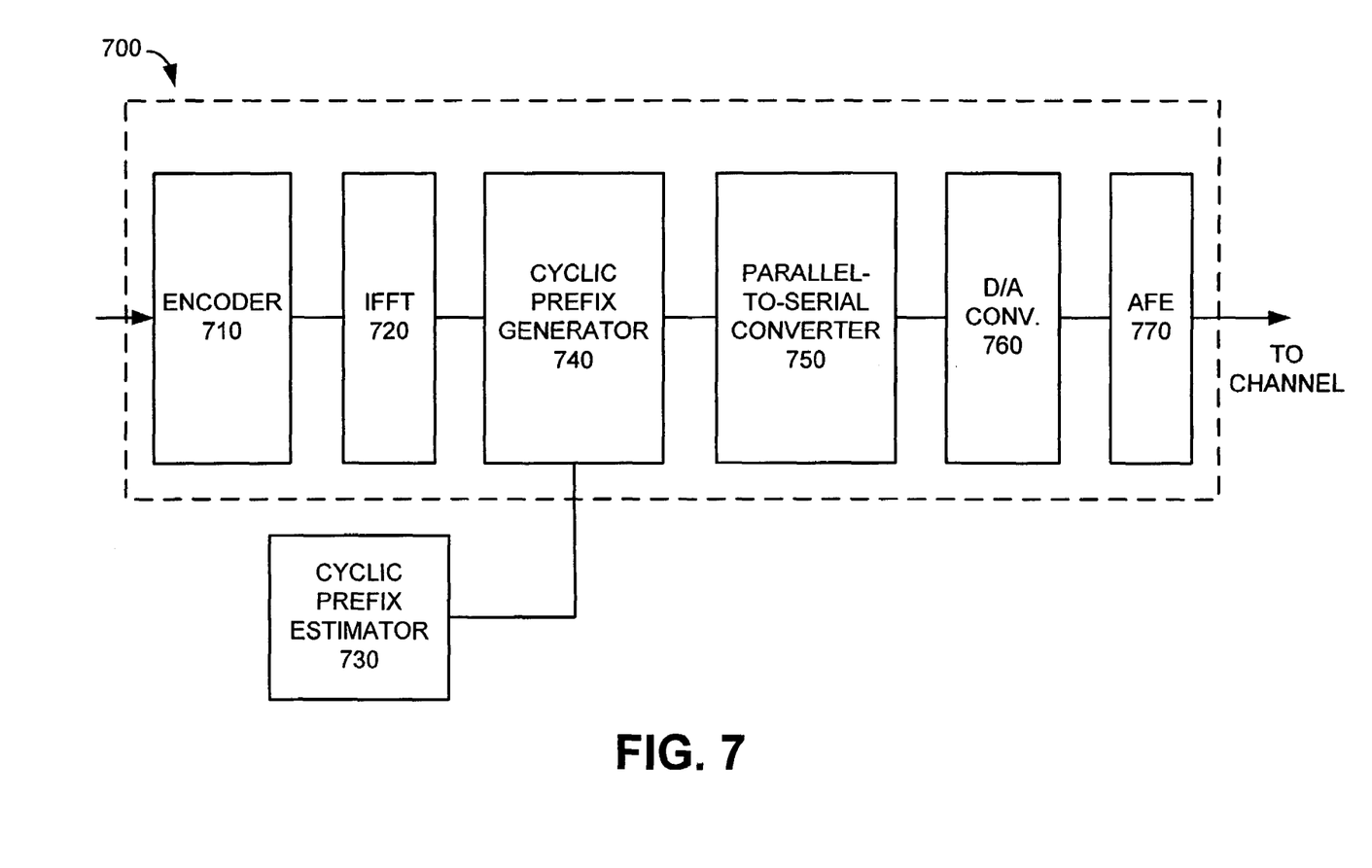
FIG. 7 is a block diagram of a transceiver according to an alternative implementation of the present invention.

In an alternative implementation, an adaptive cyclic prefix length determination is made to maximize data throughput. FIG. 7 illustrates an exemplary block diagram of a transmitter portion of a transceiver consistent with this alternative implementation. Referring to FIG. 7, transceiver 700, also referred to as transmitter 700, may be included in station 110. The transceiver in station 120 may be similarly configured. Transmitter 700 includes encoder 710, IFFT logic 720, cyclic prefix estimator 730, cyclic prefix generator 740, parallel-to-serial converter 750, D/A converter 760 and AFE 770. The encoder 710, IFFT logic 720, parallel-to-serial converter 750, D/A converter 760 and AFE 770 may perform similar functions as their corresponding components described with respect to FIG. 3. Transceiver 700 may also include receiver circuitry (not shown) that performs functions similar to those discussed above with respect to FIG. 4.

Cyclic prefix samples may be used in DMT systems to simplify equalization requirements and to assist in synchronization. One drawback with cyclic prefix samples is that they occupy bandwidth between symbols and therefore reduce the effective data rate. This implementation uses a channel adaptive cyclic prefix length determination to minimize this overhead and maximize the data throughput. In this manner, each channel will have the needed number of cyclic prefix samples, but not more, eliminating unnecessary overhead.

Figure 8A:
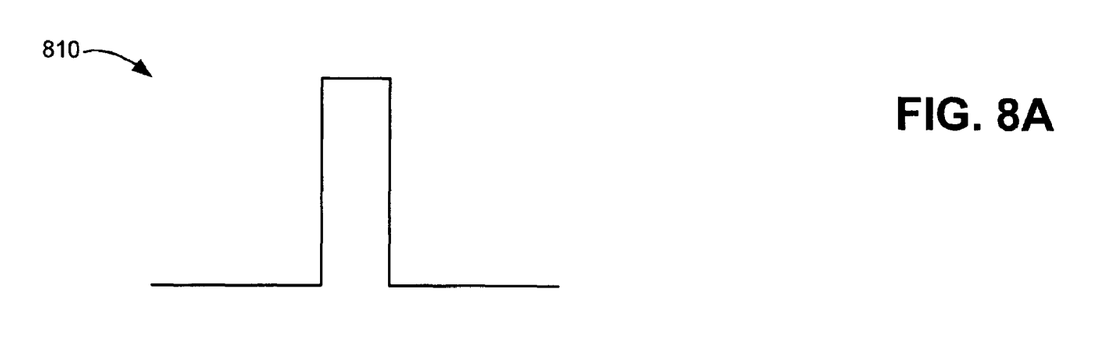
FIGS. 8A and 8B illustrate a transmitted and received pulse, respectively, in accordance with the alternative implementation illustrated in FIG. 7.

In accordance with this implementation, cyclic prefix estimator 730 adaptively estimates the cycle prefix length needed when transmitting data to other stations. For example, transmitter 700 of a station, such as station 110, may send a pulse to another station, such as station 120, during a training session. The pulse may be a narrow pulse (e.g., 1 sample wide), such as pulse 810 illustrated in FIG. 8A. The receiver of another station, such as station 120, monitors the received pulse and determines the amount of time before the narrow pulse decays below some predetermined threshold.

Figure 8B:
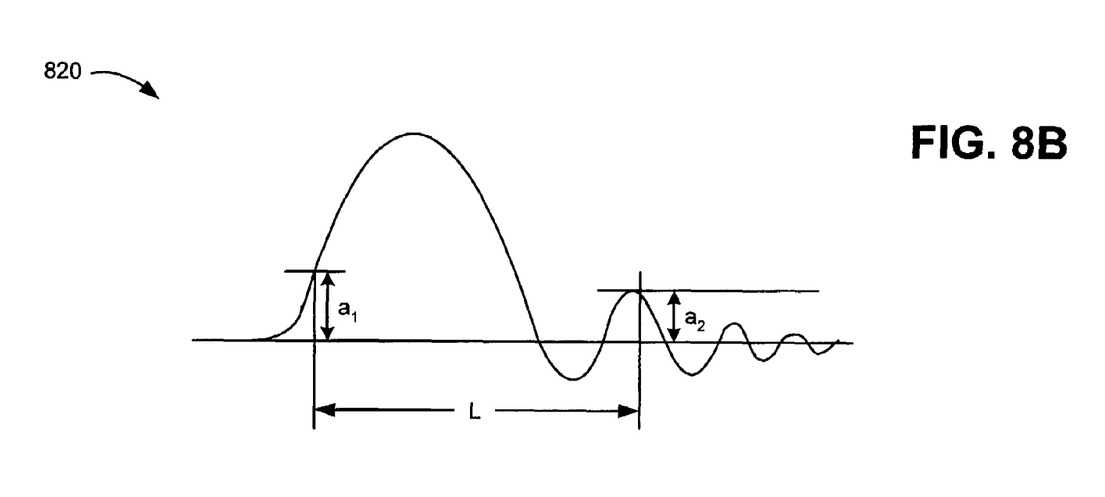

For example, FIG. 8B illustrates the pulse waveform 820 received by the receiver at station 120. The receiver may determine when the received pulse 820 decays below the value $a_2$ illustrated in FIG. 8B. The receiver may then determine the number of cyclic prefix samples that will be used such that the cyclic prefix time length is equal to the length of time needed for the received pulse to decay below $a_2$. For example, referring to FIG. 8B, the time needed for the signal to decay below $a_2$ is illustrated as L. This value indicates the length of time needed for the cyclic prefix samples. The receiver may then inform the transmitter 700 of this length of time L. The value $a_1$ in FIG. 8B represents a minimum threshold to ensure that the received pulse is not just noise. In addition, duration L may also be measured from the beginning of the received pulse illustrated in FIG. 8B.

Cyclic prefix estimator 730 may receive this information and determine the number of cyclic prefix samples that may be transmitted during time L. Cyclic prefix estimator 730 may then forward this information to cyclic prefix generator 740, which generates the appropriate number of cyclic prefix samples for transmission. This processing may be done during training/handshaking between the transmitter and receiver. In this manner, when transmitting data between stations, an adequate number of cyclic prefix samples may be used, without including unnecessary samples.

CONCLUSION

Described has been a system and method for performing timing recovery in a data transmission system. An advantage of the present invention is that clock offset between a transmitter and receiver may be estimated and compensated for at a receiver. As a result, data communications between stations are less prone to decoding errors.

Only the preferred embodiments of the invention and a few examples of its versatility are shown and described in the present disclosure. It is to be understood that the invention is capable of use in various other combinations and environments and is capable of modifications within the scope of the inventive concept as expressed herein.

For example, while the present invention has been described with respect to two stations transmitting data between themselves, the present invention may also be implemented in other network devices. In addition, while a series of acts has been described with regard to FIG. 6, the order of the acts may be varied in other implementations consistent with the present invention. Moreover, non-dependent acts may be implemented in parallel. No element, act, or instruction used in the description of the present invention should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A device configured to receive data transmitted over a network medium, comprising:
    a memory configured to store first phase information associated with a first pilot tone received by the device during a first interval; and
    logic configured to:
        identify a second pilot tone received with a plurality of tones,
        determine second phase information associated with the second pilot tone,
        determine a difference between the second phase information and the first phase information,
        use the difference to determine offset information,
        modify phase information associated with each of the plurality of tones based on the offset information,
        decode data transmitted on each of the plurality of tones during the first interval using the modified phase information,
        determine a second difference associated with a second interval, the second difference corresponding to a difference between phase information associated with a third pilot tone received by the device during the second interval and the first phase information,
        use the second difference to determine second offset information, and
        modify phase information associated with tones received during the second interval based on the second offset information.

2. The device of claim 1, wherein when using the difference to determine offset information, the logic is configured to
    divide the difference by a value associated with the first pilot tone to obtain a first value, and
    multiply the first value by values associated with each of the respective plurality of tones to determine a phase correction for each of the respective plurality of tones.

3. The device of claim 2, wherein when dividing the difference by a value, the logic is configured to:
    divide the difference by a frequency of the first pilot tone.

4. The device of claim 3, wherein when multiplying the first value by values associated with each of the respective plurality of tones, the logic is configured to:
    multiply the first value by a frequency of each of the respective plurality of tones.

5. The device of claim 2, wherein when dividing the difference by a value, the logic is configured to:
    divide the difference by a tone number of the first pilot tone.

6. The device of claim 5, wherein when multiplying the first value by values associated with each of the respective plurality of tones, the logic is configured to:
    multiply the first value by a tone number of each of the respective plurality of tones.

7. The device of claim 1, wherein the first pilot tone is transmitted with a group of tones and the logic is further configured to:
    identify the first pilot tone, and
    determine the first phase information associated with the first pilot tone.

8. The device of claim 1, wherein when using the difference to determine offset information, the logic is configured to:
    multiply the difference for each of the plurality of tones by a ratio of the frequency of each of the respective plurality of tones to the frequency of the first pilot tone.

9. The device of claim 1, wherein the logic is further configured to:
    modify phase information associated with tones received during the second interval by different amounts based on when in the second interval the tones were received.

10. In a network device that receives data transmitted using discrete multitone (DMT) modulation, a method comprising:

storing phase information associated with a first pilot tone received from a second network device;

receiving a plurality of symbols from the second network device;

identifying a second pilot tone in at least one of the plurality of symbols;

determining second phase information associated with the second pilot tone;

obtaining a difference between the first phase information and the second phase information;

dividing the difference by a value associated with the first pilot tone to obtain a first value;

multiplying the first value by values associated with each of the respective plurality of tones to determine phase correction information for each of the respective tones; and modifying phase information associated with each of the plurality of tones based on the phase correction information.

11. The method of claim 10, further comprising:
decoding data transmitted on each of the plurality of tones using the modified phase information.

12. The method of claim 10, wherein the obtaining comprises:
subtracting the second phase information from the first phase information.

13. The method of claim 10, wherein the dividing the difference by a value associated with the first pilot tone comprises:
dividing the difference by a frequency of the first pilot tone.

14. The method of claim 13, wherein the multiplying the first value by values associated with each of the respective plurality of tones comprises:
multiplying the first value by a frequency of each of the respective plurality of tones.

15. The method of claim 10, wherein the dividing the difference by a value associated with the first pilot tone comprises:
dividing the difference by a tone number of the first pilot tone, and wherein the multiplying the first value by values associated with each of the respective plurality of tones comprises:
multiplying the first value by a tone number of each of the respective plurality of tones.

16. The method of claim 10, further comprising:
receiving a second plurality of tones;
determining second phase correction information associated with the second plurality of tones based on a phase of a pilot tone transmitted with the second plurality of tones;
modifying phase information associated with each of the second plurality of tones based on the second phase correction information; and
decoding data transmitted on the second plurality of tones based on the modified phase information.

17. The method of claim 10, wherein the modifying phase information comprises modifying phase information based on the phase correction information during a first interval, the method further comprising:

modifying the phase information associated with tones received during the first interval by different amounts based on when in the first interval the tones were received.

18. A device configured to receive data transmitted over a network medium, comprising:
a memory configured to store first phase information associated with a first predetermined tone received by the device from a second device; and
logic configured to:
identify a second predetermined tone received with a plurality of tones from the second device,
determine second phase information associated with the second predetermined tone,
determine a difference between the first phase information and the second phase information,
modify phase information associated with each of the plurality of tones based on the difference, and
decode data transmitted on each of the plurality of tones using the modified phase information.

19. The device of claim 18, wherein the first and second predetermined tones each comprise a pilot tone.

20. The device of claim 19, wherein when modifying phase information associated with each of the plurality of tones, the logic is configured to at least one of:
divide the difference by at least one of a frequency and tone number associated with the pilot tone to obtain a first value and multiply the first value by at least one of a frequency and tone number associated with each of the plurality of tones; and
multiply the difference by a ratio of the frequency of each of the respective plurality of tones to the frequency of the second predetermined tone.

21. The device of claim 18, wherein the logic is further configured to:
receive a plurality of symbols, each symbol comprising a number of tones,
determine a difference between the first phase information and phase information associated with a pilot tone in each of the plurality of symbols, and
modify phase information associated with each of the tones in each of the respective plurality of symbols based on the respective differences.

22. The device of claim 18, wherein the logic is further configured to:
determine a new difference at predetermined time intervals, the new difference corresponding to a difference between phase information associated with a pilot tone and the first phase information, and
modify phase information associated with received tones based on the new difference.

23. The device of claim 22, wherein the logic is further configured to:
modify phase information associated with a first symbol received tones during a first one of the predetermined intervals by a different amount than a second symbol received during the first predetermined interval based on when the first and second symbols were received.

* * * * *